United States Patent [19]

Stout

[11] 3,855,585

[45] Dec. 17, 1974

[54] SYSTEM FOR GENERATING A DIGITAL SIGNAL INDICATIVE OF SHAFT POSITION WITH AUTOMATIC ERROR CORRECTION

[75] Inventor: George H. Stout, Mt. Prospect, Ill.

[73] Assignee: Vapor Corporation, Chicago, Ill.

[22] Filed: June 21, 1973

[21] Appl. No.: 372,312

[52] U.S. Cl. ......... 340/347 AD, 73/308, 340/244 A

[51] Int. Cl. ............ H03k 13/34

[58] Field of Search...... 340/347 AD, 347 P, 177 R, 340/177 VA, 244 R, 244 A; 73/308

[56] References Cited

UNITED STATES PATENTS

| | | | |
|---|---|---|---|
| 3,007,637 | 11/1961 | Meirowitz | 340/347 AD |
| 3,148,542 | 9/1964 | Clift | 73/308 |
| 3,188,626 | 6/1965 | Palmer | 340/347 P |
| 3,648,276 | 3/1972 | Schuman | 340/347 P |
| 3,683,368 | 8/1972 | Ebner | 340/347 P |

OTHER PUBLICATIONS

Susskind, "Notes on Analog–Digital—, " Technology Press of MIT, 1957 pages 6–45 through 6–55.

*Primary Examiner*—Thomas J. Sloyan
*Attorney, Agent, or Firm*—Lloyd L. Zickert

[57] ABSTRACT

A data transmission system for providing from a coarse analog signal representative of the cumulative angular position of a shaft, and from a fine analog signal representative of the non-cumulative angular position of the shaft, a digital output indication of the cumulative position of the shaft. The coarse analog signal is utilized to provide the most significant digits and the fine analog signal is utilized to provide the least significant digits of the output display. Error correction means responsive to coarse and fine analog signals are provided for modifying the most significant portion of the output display to compensate for errors therein which may occur as a result of lower resolution in the encoder used to generate the coarse signal.

7 Claims, 7 Drawing Figures

FIG. 1
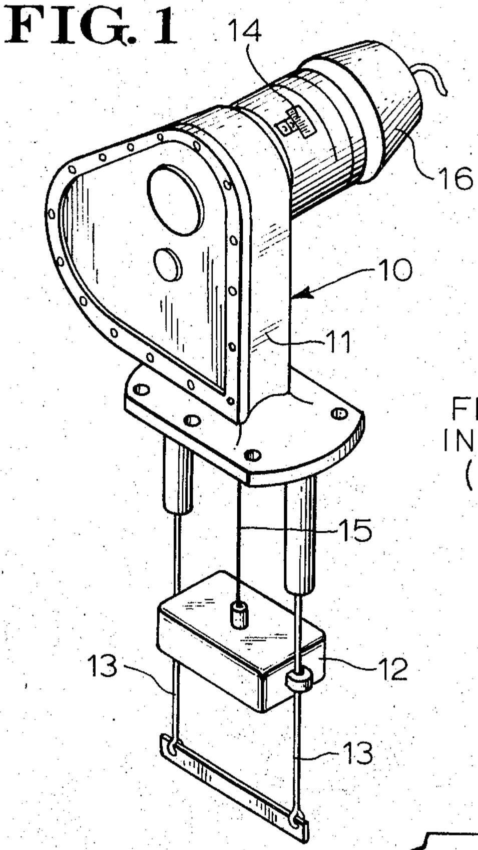
FIG. 5
COARSE INPUT (C)
FINE INPUT (F)
| | 0 | .1 | .2 | .3 | .4 | .5 | .6 | .7 | .8 | .9 |
|---|---|---|---|---|---|---|---|---|---|---|
| 0 | | | | | | | +1.0 | +1.0 | +1.0 | +1.0 |
| .1 | | | | | | | | +1.0 | +1.0 | +1.0 |
| .2 | | | | | | | | | +1.0 | +1.0 |
| .3 | | | | | | | | | | +1.0 |
| .4 | | | | | | | | | | |
| .5 | -1.0 | | | | | | | | | |
| .6 | -1.0 | -1.0 | | | | | | | | |
| .7 | -1.0 | -1.0 | -1.0 | | | | | | | |
| .8 | -1.0 | -1.0 | -1.0 | -1.0 | | | | | | |
| .9 | -1.0 | -1.0 | -1.0 | -1.0 | -1.0 | | | | | |
FIG. 2
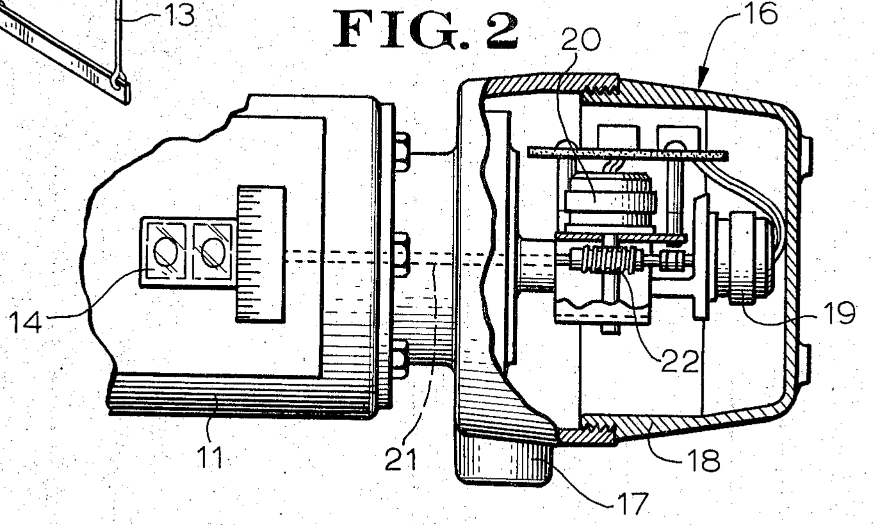
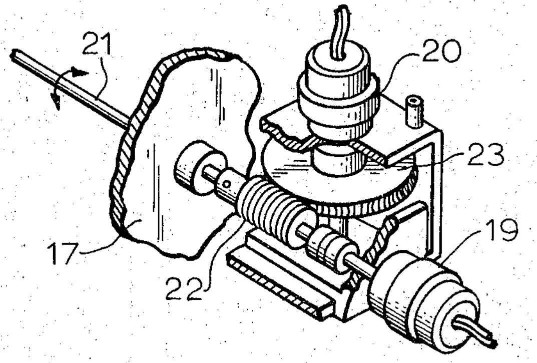
FIG. 3

SYSTEM FOR GENERATING A DIGITAL SIGNAL INDICATIVE OF SHAFT POSITION WITH AUTOMATIC ERROR CORRECTION

The present invention is directed generally to data transmission systems, and more particularly to an improved data transmission system for remotely reading the level or position of a liquid product in a storage tank.

In a variety of industrial control and data acquisition systems it is often necessary to accurately measure selected system parameters, such as the level of a liquid stored in a remote storage tank, and thereafter to encode and transmit the reading to a central station at which the measurements are indicated, monitored or recorded. By virtue of this arrangement an operator can determine, for example, to which of the remote storage tanks an incoming product should be directed, or from which of the remote tanks an outgoing product should be removed. Furthermore, the total product on hand can be determined quickly without the necessity of dispatching personnel to each tank to visually read individual product level gauges.

Generally, data transmission systems for remotely reading product levels employ a float-operated gauge and an encoder mechanically coupled to the gauge to convert the gauge reading into an electrical signal for transmission by wire or radio to the central monitoring point. The encoder may take the form of either a plurality of disc-type switches which generate binary output signals corresponding to the gauge reading, generally in some basic unit of measurement such as feet or meters, and some sub-unit thereof such as inches or centimeters, or one or more potentiometers which provide analog signals indicative of these basic units and sub-units. The potentiometer-type encoder has the advantage of providing greater resolution, particularly where a pair of potentiometers are provided interconnected by appropriate gearing such that one, the most significant or coarse-reading potentiometer, indicates a number of integral units, and the other, the least significant or fine-reading potentiometer, indicates fractions of that unit. The two readings are combined at the central reading station to provide an accurate digital product level indication, the coarse reading providing the more significant digits of the display, and the fine reading providing the less significant fractional-unit digits of the display.

The use of multiple potentiometers introduces the possibility of an erroneous reading when the product level approaches an integral number of units. This is because the coarse-reading potentiometer, which lacks the precision of the fine-reading potentiometer over an individual unit of measurement because of nonlinearities in its resistance element and backlash in its drive gears, may err sufficiently from the fine-reading potentiometer to indicate one unit higher or lower than the true product level, as indicated by the fine-reading potentiometer. To eliminate this error a correction factor of +1 or −1 must be applied to the coarse reading.

Accordingly, the present invention is directed to a data transmission system for providing a digital output display having a most significant and a least significant portion indicative of the position of a movable element within a predetermined range of movement in terms of predetermined units of measurement.

A first encoder responsive to the position of the element within the range of movement provides a first data signal indicative of the position of the element in terms of an integral number of units of measurement, and a second encoder responsive to the position of the element within the units of measurement provides a second data signal indicative of the position of the element in terms of fractional parts of the units of measurement. The system includes display means responsive to the first signal for displaying the most significant portion of the output indication, the display being subject to an error of plus or minus one of the units of measurement, and responsive to the second signal for displaying the least significant portion of the output indication, and error correction means for modifying the first data signal according to the data signal from the second encoder to compensate for the one unit error, if present, in the most significant portion of the digital output indication.

Accordingly, it is a general object of the present invention to provide a new and improved data transmission system.

It is a further object of the present invention to provide a new and improved data transmission system for remotely reading the level of a product in a storage tank.

It is a still further object of the present invention to provide a data transmission system which provides an unambiguous output display derived from multiple input readings of different significance and precision.

It is another object of the present invention to provide a data transmission system having coarse and fine inputs wherein errors in the coarse reading are compensated for in the final output indication.

It is still another object of the present invention to provide a data transmission system wherein a more significant but less precise reading is automatically compensated to provide in conjunction with a less significant but more precise and unambiguous output indication.

It is still another object of the present invention to provide a data transmission system which provides an unambiguous digital output display from two remote analog inputs indicating product level within a storage tank with varying degrees of significance and precision.

Other objects, features and advantages of the invention will be apparent from the following detailed disclosure, taken in conjunction with the accompanying sheets of drawings, wherein like reference numerals refer to like parts, in which:

FIG. 1 is a perspective view of a product level transmitter incorporating a data encoder for enabling the level of a liquid product to be read at a remote location.

FIG. 2 is a side elevation view, partially fragmented, of the data encoder portion of the product level transmitter of FIG. 1.

FIG. 3 is a perspective view, partially fragmentary, showing the gear arrangement and potentiometers of the data encoder of FIG. 2.

FIG. 5 is a tabulation of correction factors useful in understanding the functioning of the data transmission system of the invention.

Figure 4:
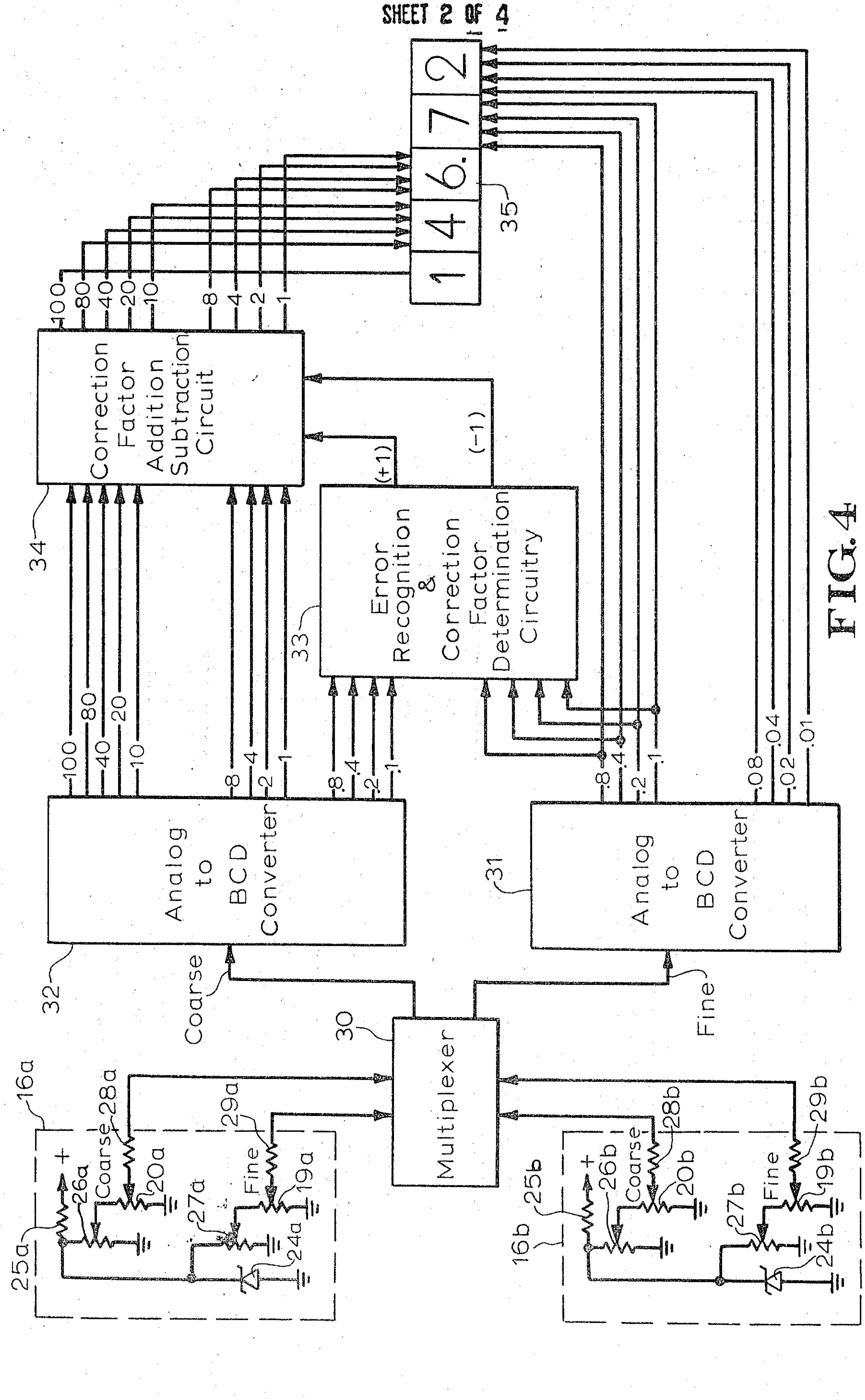
FIG. 4 is a functional block diagram, partially schematic, of a data transmission system constructed in accordance with the invention.

The data transmission system of the invention is utilized in connection with a data acquisition device such as the gauge head 10 of FIG. 1, which is intended to measure the level of a liquid product within a storage tank. Basically, this gauge head comprises a housing 11 mounted on top of the storage tank, a float 12 which is constrained by a pair of vertical spaced-apart guide wires 13 to rise and fall with changes in liquid level within the storage tank, and a plurality of indicator wheels 14 to indicate liquid level. The float is coupled to the indicator wheels by means of tape 15 which is wound onto a spring-balanced reel with housing 11, the reel being rotatably coupled to the indicator wheels by a shaft and appropriate gearing.

To enable the gauge head to generate an electrical signal indicative of the product level, an analog encoder 16 is mechanically coupled to the indicator wheels. Referring to FIG. 2, this encoder comprises a two-section housing consisting of a base section 17, and a cover section 18 which threads onto the base section. A pair of potentiometers 19 and 20 are provided within the housing for generating position-indicative electrical signals. Potentiometer 19, henceforth termed the fine-reading potentiometer, is axially aligned with indicator wheels 14 and directly coupled thereto by a shaft 21 so as to make one complete revolution with each rotation of the least significant indicator wheel.

Referring to FIG. 3, potentiometer 20, henceforth termed the coarse-reading potentiometer, is perpendicularly aligned with shaft 21 and indirectly coupled thereto by means of a worm gear 22 and a worm follower gear 23. This results in a net turns reduction between shaft 21 and potentiometer 20, so that the potentiometer makes one complete revolution after a predetermined number of revolutions of shaft 21. The net turns reduction afforded by gears 22 and 23 is such that potentiometer 20 will provide a continuous progressively variable analog output signal as float 12 rises from the bottom to the top of the tank. At the same time, potentiometer 19, a continuous-rotation type potentiometer, rotates once for each unit change in the level of float 12, providing a more accurate but less significant indication in fractional units of position of float 12.

Referring to FIG. 4, a data transmission system is shown which incorporates two encoders 16*a* and 16*b*, representing two different product level gauges on two different storage tanks. Encoder 16*a* comprises a zener diode 24*a* connected to a source of unidirectional potential by a series voltage dropping resistor 25*a*. The constant potential developed across zener diode 24*a* is impressed across two parallel-connected calibrating potentiometers 26a and 27*a*, which provide means for compensating for different data transmission line lengths between the storage tanks and the common reading station. The arms of potentiometers 26*a* and 27*a* are connected to one end terminal of respective ones of position encoding potentiometers 20*a* and 19*a*, the other end terminals of which are connected to ground. The arm of potentiometer 20*a*, providing a progressively variable output signal indicative of liquid level, and the arm of potentiometer 19*a*, providing a less signficiant but more precise fractional-unit output signal, are coupled by series current-limiting resistors 28*a* and 29*a*, respectively, and a data transmission line of appropriate length to a multiplexor stage 30.

Another pair of level-indicative signals is provided by a second encoder 16*b*, which would ordinarily be associated with another liquid level gauge on another storage tank. This encoder may be identical in structure and operation to encoder 16*a*, comprising a zener diode 24*b*, series voltage dropping resistor 25*b*, calibration potentiometers 26*b* and 27*b*, position encoding potentiometers 19*b* and 20*b*, and current limiting resistors 28*b* and 29*b*. Multiplexor 30 selects a signal pair from either encoder 16*a* or 16*b* for processing and eventual display or recordation at the central reading station. In practice, additional inputs would be provided to multiplexor 30 from additional storage tanks or reading stations, the maximum number being limited only by practical considerations of transmission line length and reading frequency.

The output of multiplexor 30, a pair of coarse and fine analog signals from a selected reading station, is converted to coarse and fine binary coded decimal (BCD) signals by separate analog-to-BCD converters. Specifically, the fine-reading analog signal is applied to an analog-to-BCD converter 31 which provides BCD tenths outputs of .8, .4, .2, .1, and BCD hundredths outputs of .08, .04, .02, and 101, providing an output in the range of .00–.99, which represents the least significant but most precise portion of the transmitted data. Similarly, the coarse-reading analog output of multiplexor 30 is applied to an analog-to-BCD converter 32, which converts the progressively variable analog signal to a hundreds output, BCD tens outputs of 80, 40, 20, and 10, BCD units outputs of 8, 4, 2, and 1, and BCD tenths outputs of .8, .4, .2, and .1, providing an output from 0.0 to 199.9, which represents the most significant portion of the transmitted data. The hundreds, tens and units BCD outputs of the coarse-reading potentiometer are combined with the tenths and hundredths BCD outputs of the fine-reading potentiometer to obtaina single digital output display.

As mentioned previously, the measurement of a quantity having a large range, correct to a small or fine increment requires that the total range be divided into major or coarse units each comprising an integral number of a primary or fine measuring unit. For example, to measure the total number of minutes in a day using a 60 minute stop watch, the day (the total range) is divided into hours (the coarse increment) and each hour is measured in minutes (the fine increment). The coarse increments may be measured independently and the composite of the two measurements-coarse and fine-may be combined to obtain an output reading of the time of day.

It will be noted that to obtain an accurate composite reading of two measurements, the coarse measurements has to have accuracy better than 50 percent of the fine measurement range. For example, when the minute hand is at 12, should the hour hand be half-way between say 8 and 9, the clock would ambiguously indicate 8 o'clock or 9 o'clock. For an accurate composite reading, the hour hand has to be closer to 8 or 9 than half-way, namely 50 percent of the minute hand range; i.e., give better indication of the hour than 8:30, or have better accuracy.

In applying this principle in the measurement of true quantity of 99.99 in the range from 00.01 to 100.00, the fine measurement within 0.5 percent yields 99.98 or 99.99. While the coarse measurement, having accuracy greater than 50 percent of the fine range, say 0.48 percent gives a reading between 99.51 and 100.47. The composite worst case, reading of 100.98 made up of the highest coarse reading plus the lowest fine reading, is rejected because the difference of fine measurement and the same as measured in taking the coarse measurement exceeds the premise of 0.48 (0.98 – 0.47 = 0.51). Thus, the correct non-ambiguous reading is 99.98 or 99.99.

By comparing the actual coarse and fine measurements a correction factor can be applied to either decrease or increase by one the coarse measurement in certain instances and in remaining instances no correction is required. Specifically, the coarse increment reading is decreased by 1 count under the following conditions:

a. $F \geqslant 5$
b. $C < 5$ and
c. $|F - C| \geqslant 5$ : if $|F - C| < 0$ add 10 to $F$ where F is the most significant digit of the fine measurement and C is the least significant digit of the coarse measurement. In a precise coarse measurement C equals F.

The count is increased by 1 count under the following conditions:

d. $F < 5$
e. $C \geqslant 5$ and
f. $|F - C| < 5$ : If $|F - C| < 0$ add 10 to $F$ In the instances that conditions *a*, *b* and *c* or conditions *d*, *e* and *f* cannot be satisfied, the coarse increments count is left un-altered as measured. The correction factor applied to the coarse increments for all possible combinations F and C are charted in FIG. 5.

It will be appreciated that, while shown for two measurement ranges, the above manner of obtaining a correct composite, non-ambiguous reading from measurements of two ranges can be extended to any number of measurement ranges.

In the present embodiment, because of the inherently greater resolution of the direct-coupled fine-reading potentiometer as compared to the geared-down coarse-reading potentiometer, the possibility exists that the two potentiometers will not track exactly and an erroneous output reading will result when the indicated product level is or approaches an integral number of units. This is because the coarse potentiometer, which provides the only indication of full measurement units, may err sufficiently to indicate a level one unit higher or lower than the true level of the product, as indicated by the fine-reading potentiometer. For example, assume the BCD output generated by the fine-reading potentiometer for a product level of 149.96 is 0.96 and the BCD output generated by the coarse-reading potentiometer is 150.1. The two least signficant digits of the output display, 0.96, can be obtained directly from the fine reading. However, the three most signficant digits of the output display cannot be obtained directly from the coarse reading because that reading, by reason of its lower precision, is in error by 0.2 unit relative to the fine reading. Accordingly, it is necessary to correct or compensate the coarse reading by subtracting one unit (a correction factor of −1) to obtain a proper output indication of 149.96. A correction factor may also be necessary where the coarse-reading potentiometer provides a reading one unit low, as where the fine-reading potentiometer exceeds the next integral unit and the coarse-reading potentiometer reads below that unit. In that case it is necessary to add one unit to the BCD output of the coarse-reading potentiometer to obtain the proper output indication.

The necessary correction of the coarse BCD reading is accomplished in the data transmission system of the present invention by means of an error recognition and correction factor determination circuit 33. The BCD tenths outputs of analog-to-BCD converters 31 and 32 are applied to this stage, which contains appropriate circuitry for comparing the two inputs and generating an appropriate output command signal for either adding or subtracting one unit from the coarse BCD reading. The actual addition or subtraction of the correction factor is accomplished by an addition-subtraction circuit 34, which operates directly on the units, tens and hundreds BCD outputs of analog-to-digital converter 32.

The BCD hundredths and tenths outputs of analog to BCD converter 31 are applied directly to utilization means, in this case the hundredths and tenths inputs of a five digit numerical display device 35, which may be a conventional LED or nixie tube type display. Similarly, the units, tens and hundreds BCD outputs of addition-subtraction circuit 34 are applied to the units, tens and hundreds inputs of the display devices.

The correction factor, if any, applied to the coarse BCD reading is dependent on the BCD tenths outputs supplied by analog-to-BCD converters 31 and 32 to error recognition and correction factor determination circuitry 33, as shown by the tabulation of FIG. 5. For example, a coarse reading of 150.1 and a fine reading of 0.96 will result in a correction factor of −1. This is obtained in FIG. 5 by reference to a coarse reading of 0.1 and a fine reading of 0.9. Conversely, assuming a coarse reading of 149.97 and a fine reading of 0.13, a correction factor of +1 is called for, which when added to the coarse reading results in an output display of 150.13.

Figure 6:
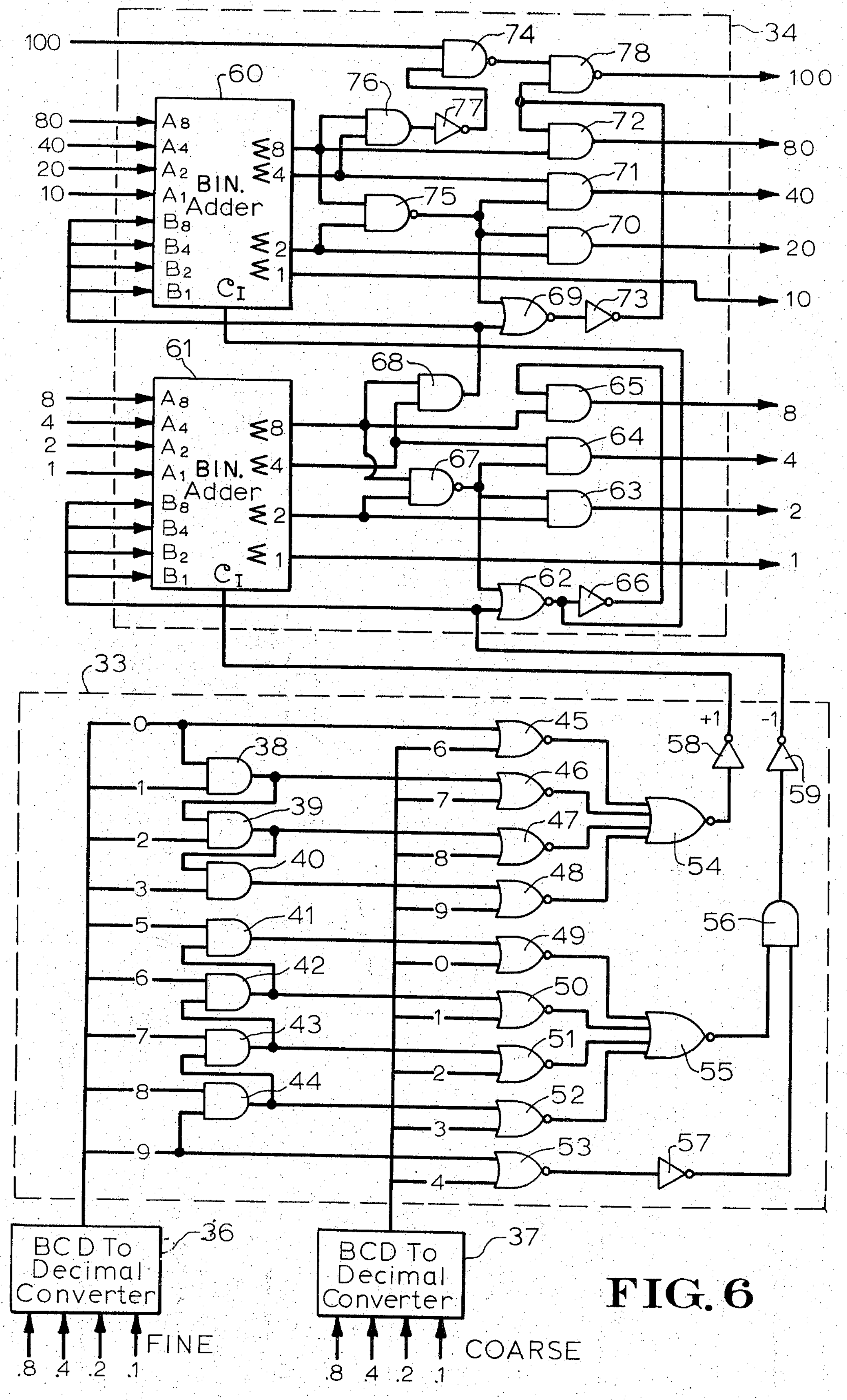
FIG. 6 is a schematic diagram of the error recognition and correction factor determination circuits of the data transmission system of FIG. 4.

Having considered the operation of the data transmission system as a whole, we are now in a position to consider in detail the circuitry of the error recognition and correction factor determination stage 33 and the correction factor addition-subtraction stage 34. Referring to FIG. 6, a preferred circuit for stage 33 comprises a BCD-to-decimal converter 36, which converts the BCD fine reading from multiplexor 30 into a decimal output. To this end converter 36, which may be entirely conventional in design and construction, provides nine individual decimal outputs 0–3 and 5–9. Similarly, the coarse reading from multiplexor 30 is supplied to another BCD-to-decimal converter 37, which also may be conventional in design and construction, and which converts the BCD signal into individual decimal outputs 0–4 and 6–9.

To accomplish selection of a correction factor in accordance with the tabulation shown in FIG. 5, the 1, 2, 3, 5, 6, 7 and 8 outputs of converter 36 are applied to one input of respective ones of AND gates 38–44. The 0 and 9 outputs of converter 36 are applied to the remaining inputs of AND gates 38 and 44, respectively. The outputs of AND gates 38, 39, 42, 43 and 44 are applied to the remaining inputs of gates 39–43, respectively. The 0 output of converter 36 is also applied to one input of a NOR gate 45. The outputs of AND gates 38–44 are applied to one input of respective ones of NOR gates 46–52, and the 9 output of converter 36 is also applied to one input of a NOR gate 53. The outputs of NOR gates 45–48 are applied to respective inputs of a four input NOR gate 54, and the outputs of NOR gates 49–52 are applied to respective inputs of a four input NOR gate 55. The 6, 7, 8, 9, 0, 1, 2, 3 and 4 outputs of converter 37 are applied to the remaining inputs of NOR gates 45–53, respectively. The output of NOR gate 55 is applied to one input of AND gate 56, and the output of NOR gate 53 is applied by way of an inverter 57 to the remaining input of AND gate 56. The outputs of NOR gate54 and AND gate 56 are applied to respective ones of inverters 58 and 59 prior to application to correction factor addition-subtraction circuits 34.

Each of the AND and NOR logic elements, as is well known to the art, has two operating states. These states are generally defined in terms of high and low voltage conditions, a high voltage condition being approximately the reference or supply voltage, generally in the order of 5.0 volts for the most common logic elements, and a low state being some value less than reference, generally near or equal to 0 volts or ground potential. In the case of an AND gate, the output terminal is high if and only if both input terminals are high. In the case of a NOR gate, the output terminal is high if and only if both input terminals are low.

The manner in which the logic elements in the error recognition and correction factor determination circuit 33 function to provide the correction factors called for in FIG. 5 can be best illustrated by again considering two product level measurement situations. Assume for a product level of 146.96 a fine reading of 0.96 and a coarse reading of 147.1 are obtained. This causes converter 36 to develop a low on its terminal 9 and a high on all its other output terminals. This forces the output of AND gate 44 low, which in turn forces the outputs of AND gates 43, 42 and 41 low by way of the interconnections between these elements. At the same time converter 37 develops a low on its terminal 1 and a high on all of its other output terminals. The low output on terminal 1 and the low output of AND gate 42 force the output of NOR gate 50 high. The other NOR gates 45–49 and 51–52 are all low at this time by virtue of having a high applied to at least one input terminal. The high output of NOR gate 51 is applied to one of the inputs of NOR gate 55, establishing a low output from that element. At the same time, the output of NOR gate 54 is high because all of its inputs are low, and the output of NOR gate 53 is low because of the high on output terminal 4 of converter 37. The low output of NOR gate 55, and the high output of NOR gate 53, inverted to a low by inverter 57, force the output of AND gate 56 low. This output is inverted by inverter 59 to a high, which comprises a command signal for causing a correction factor of −1 to be applied to the coarse potentiometer reading.

Considering another example, assume a product level of 147.13, a coarse reading of 146.9, and a fine reading of 0.13. Now the one output terminal of converter 36 is low and all of its other output terminals are high. This forces AND gates 38–40 low and AND gates 41–44 high. At the same time, the 9 output terminal of converter 37 is low and all other output terminals of this converter are high. This forces NOR gate 48 high and the other NOR gates 45–47 and 49–53 low. NOR gate 54 is in turn forced low, and this output converted to a high by inverter 58, comprises a command signal for causing a correction factor of +1 to be applied to the coarse potentiometer reading.

Having covered the generation of +1 and −1 correction factor command signals, the circuitry of the correction factor addition subtraction stage 34 can now be illustrated. This stage comprises a pair of conventional binary adder elements 60 and 61 which provide a binary output signal (Σ1,Σ2,Σ4,Σ8) representative of the sum of two applied binary input signals ($A_1$, $A_2$, $A_4$, $A_8$) and ($B_1$, $B_2$, $B_4$, $B_8$). These elements are also capable of adding a single unit to the applied BCD A input signal upon application of a high command signal to their carry input $C_I$, or count-increase, terminals. The output of inverter 58, representing when high a command to add one unit to the coarse potentiometer reading, is applied to the $C_I$ terminal of the units binary adder 61, and the output of inverter 59, representing when high a command to subtract one unit from the coarse potentiometer reading, is coupled to all four of the binary B inputs of adder 61 and to one input of a NOR gate 62. The BCD units portion of the coarse potentiometer reading is applied to the A input of adder 61. The binary 1 output of the adder is coupled directly to the BCD 1 input of the units portion of display element 35. The binary 2, 4, and 8 outputs of adder 61 are coupled to one input of respective ones of three AND gates 63, 64 and 65. The output of NOR gate 62 is coupled to the $C_I$ count-increase terminal of the tens binary adder 60, and to the remaining terminal of AND gate 65 by way of an inverter 66. The binary 2 and 8 outputs of adder 61 are also connected to respective ones of the two inputs of a NAND gate 67, the output of which is connected to the remaining inputs of AND gates 63 and 64 and NOR gate 62. The binary 4 and 8 outputs of adder 61 are also connected to respective ones of the inputs of an AND gate 68, the output of which is connected to one input of a NOR gate 69 and to the four binary B inputs of the tens adder 60.

The binary 1 output of adder 60 is connected directly to the BCD 1 input of the tens portion of display unit 35. The binary 2, 4, and 8 outputs are connected to inputs of respective ones of AND gates 70, 71 and 72. The output of NOR gate 69 is connected through an inverter 73 to the remaining input of AND gate 72 and to one input of a NAND gate 78. The binary 2 and 8 outputs of adder 60 are also connected to respective ones of the imputs of NAND gate 75, the output of which is connected to the remaining inputs of AND gates 70 and 71 and NOR gate 69. The binary 4 and 8 outputs of adder 60 are further connected to respective ones of the inputs of an AND gate 76, the output of which is connected through an inverter 77 to one input of a NAND gate 74. The tens BCD output of analog-to-BCD converter 32, representing the tens reading of the coarse potentiometer, is connected to the A input of binary adder 60, and the hundreds output of converter 32 is connected to the remaining terminal of NAND gate 74. The output of gate 74 is connected to the remaining input terminal of NAND gate 78, and the output of gate 78 is connected directly to the hundreds digit input of the system indicator 35.

In operation, the output of inverter 58, when high, constitutes a +1 command which causes binary adder 61 to develop an output one unit greater than the coarse BCD units reading applied to its A input. The output of inverter 59, when high, constitutes a −1 command, which when applied to the four binary B inputs of binary adder 61 causes the adder, in a manner well known to the art, to develop a binary output one unit less than the applied BCD A input. It remains for gates 62–68 to provide the carrying and borrowing operations which may be necessary between the three digits of the coarse reading prior to display.

The need for a carry operation arises when the units adder 61 has a BCD 9 A input and corresponding binary 9 output state, and a +1 correction factor is called for by way of a high output from inverter 58. This results in a binary 10 output state for adder 61, making it necessary to display a 0 and carry a one onto the tens adder stage 60. In the present embodiment this is accomplished by means of AND gates 63–65 and 68, NAND gate 67 and NOR gate 62. In the ten state the binary 2 and 8 outputs ($\Sigma_2$,$\Sigma_8$) are high and the binary 1 and 4 outputs ($\Sigma_1$,$\Sigma_4$) are low. The 2 and 8 outputs force NAND gate 67 low, which inhibits AND gates 63 and 64, forcing low BCD 2 and 4 outputs to the units digit display. The output of NOR gate 62, by virtue of two applied low inputs, is high, and as such causes a one unit carry within the tens binary adder 60. The high output of NOR gate 62, inverted to a low by inverter 66, inhibits AND gate 65, forcing a low BCD 8 output to the units digit output display. The binary 1 output ($\Sigma_1$) of adder 61, already low, is translated directly to the units digit display. Thus, all outputs applied to the units digit indicator are low, thereby obtaining a 0 units display after the carry operation.

The circuitry associated with the tens adder 60 operates in essentially the same manner in carrying a unit to the hundreds position when adder 60 is advanced to a 10 state. The output of NAND gate 75, low when commanding a carry is applied to one input of NOR gate 69 causing a high output from NOR gate 69 because the other input is also a low. This high is inverted to a low by Inverter 73 and applied to one input of NAND gate 78 forcing NAND gate 78 high. The high output of NAND gate 78, when applied to the hundreds input of display device 35 causes a hundreds digit to be displayed. Since all of the outputs applied to the tens digit indicator are low, a zero tens digit is displayed after the carry.

In the event that the binary units adder 61 has a BCD 0 coarse units reading applied to its A input prior to generation of a −1 command at inverter 59, it becomes necessary to borrow from tens adder 60. This condition results in all four of the binary outputs of adder 61 becoming high when the −1 command signal from inverter 59 is applied to the B input of the adder. The high binary 4 and 8 outputs of units adder 61 force AND gate 68 high, which renders all four binary B inputs of tens adder 60 high. As is well known to the art, the application of highs to all of the B inputs results in a one unit subtraction in counter 60, thus accomplighing the desired borrowing operation. This forces NAND gate 67 low, inhibiting AND gates 63 and 64. NOR gate 62 remains low because the high from inverter 59 is applied to its other input. The low state of NOR gate 62 has no effect on tens adder 60, but when inverted by inverter 66 enables AND gate 65. Since the other input of gate 65 is high, a high BCD 8 output is applied to the units digit display. Furthermore, since the binary 1 output of adder 61 is high, and AND gates 63 and 64 are inhibited, high BCD 1 and low BCD 2 and 4 outputs are also supplied to the units digit display. Since only the BCD 8 and 1 outputs are high, a 9 units digit is displayed after the borrowing operation. The binary tens adder 60 can also borrow from the hundreds digit. This is accomplished in a manner similar to that previously described, except that the output of AND gate 76 being high is inverted to a low by inverter 77 and applied to NAND gate 74 forcing its output high. The high output of NAND gate 74 is applied to one input of NAND gate 78. The output of NOR gate 69 low during a borrowing operation is applied with inversion to the other input of NAND gate 78 causing the output of NAND gate 78 to be low. The low BCD 100 output prevents a hundreds digit from being displayed by indicator 35.

Figure 7:
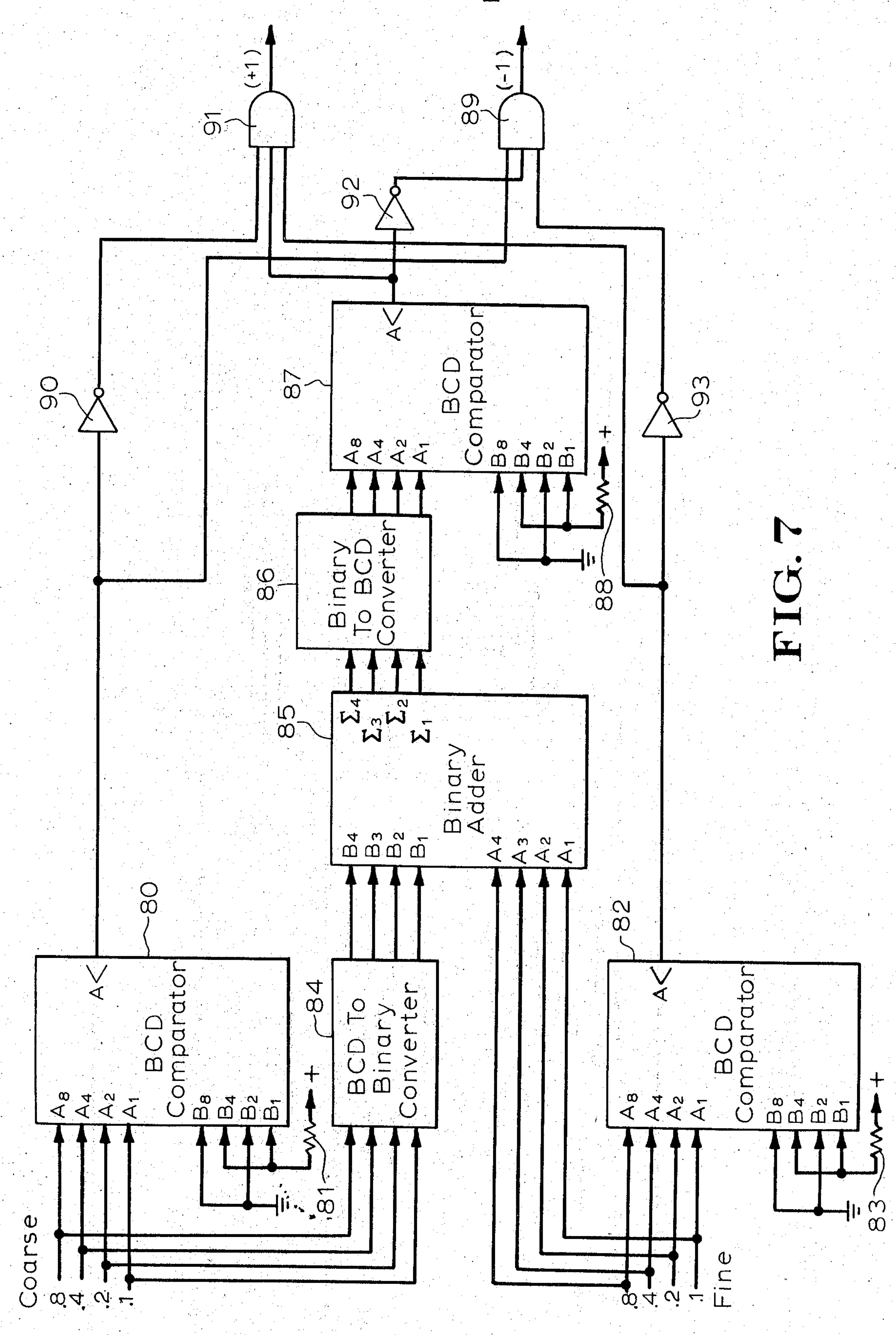
FIG. 7 is a logic and schematic diagram, partially in block form of alternate circuitry for the error recognition and correction factor determination circuits of the data transmission system of FIG. 4.

An alternate circuit for the error recognition and correction factor determination stage 33 is shown in FIG. 7. In this case the coarse BCD reading is applied directly to one input (A) of a conventional BCD comparator stage 80. A BCD 5 is applied to the other input (B) of this comparator stage by means of a resistor 81 connected between the BCD 1 and 4 inputs and a source of positive unidirectional current. The output of comparator 80, as is well known to the art, becomes high only when the A input is less than the B input, or when the coarse BCD input is less than 5. The fine BCD reading is likewise applied to the A input of another BCD comparator stage 82, which compares that signal with a BCD 5 generated at its B input by a resistor 83 connected to a source of unidirectional current. Only when the A input is less than the B input, or when the fine BCD input is less than 5, will the output of comparator 82 become high.

The coarse BCD measurement signal is also supplied to a conventional BCD tens complementary converter 84, which in a manner well known to the art forms the tens complement of the applied signal. This complement is applied directly to one input (B) of a conventional binary adder 85. The fine BCD reading is applied to the other input (A) of adder 85. The two inputs are added to form a binary sum which is applied to a conventional binary-to-BCD converter stage 86 which converts the binary sum signal back to a BCD format in a manner well known to the art so that the converted BCD format is absolute difference at the A and B inputs to the adder. This difference signal is next applied to one input of a conventional BCD comparator stage 87, wherein it is compared with a BCD 5 applied to the other input (B) of the stage by a resistor 88 connected to a source of unidirectional current. The output of comparator 87 becomes high only when the difference between the two applied signals is less than 5.

The output of BCD comparator 80, high when the coarse reading is less than 5, is applied directly to one input of AND gate 89, and by way of an inverter 90 to one input of an AND gate 91. The output of comparator stage 87, high only when the difference between the coarse and fine readings is less than 5, is applied directly to AND gate 91 and by way of an inverter 92 to one of the remaining inputs of AND gate 89. The output of comparator 82, high only when the fine reading is less than 5, is applied directly to the remaining terminal of AND gate 91 and by way of an inverter 93 to the remaining input terminal of AND gate 89.

In operation, the coarse reading is applied to comparator 80, which generates an output only when the absolute value of the coarse reading is less than 5. The coarse reading is also applied to the BCD tens compenmentary converter 84 which converts the applied reading to its tens complement, which is applied to one input of binary adder 85. The fine reading is applied directly to the other input of adder 85 to be added to the complement of the coarse reading. The result is that the two readings are subtracted, the net difference appearing at the output of adder 85. This difference signal is converted back to a BCD format by converter 86, and then applied to comparator stage 87. Only when the absolute value of the applied difference signal is less tha 5 does the output of comparator 87 become high. The fine reading is also applied to one input of comparator 82, which produces an output only when the absolute value of the fine reading is less than 5.

The inverted output of comparator 80 and the non-inverted outputs of comparators 82 and 87 are applied to AND gate 91, which produces an output if and only if all of its inputs are high. Since this condition can occur only if the coarse tenths reading is not less than 5, the absolute difference between the coarse and fine readings is less than 5, and the fine tenths reading is less than 5, the conditions defined in FIG. 5 for a +1 correction factor are fulfilled. The non-inverted output of comparator 80 and the inverted outputs of comparators 82 and 87 are applied to AND gate 89, which produces an output if and only if all of its inputs are high. Since this condition can occur only if the coarse tenths reading is less than 5, the absolute difference between the coarse and fine readings is greater than or equal to 5, and the fine tenths reading is greater than or equal to 5, the conditions defined in FIG. 5 for a −1 correction factor are fulfilled. The outputs of gates 89 and 91 are applied to correction factor addition-subtraction stage 34 to initiate their respective corrections to the coarse reading.

The logic elements utilized in the aforedescribed circuitry will be recognized as standard commercially available units. For example, the BCD adders 60, 61 and 85 may be types 7483, the BCD-to-decimal converters 36 and 37 may be types 7442, complementary BCD comparators 80, 82 and 87 may be types 7485, the BCD tens complementary converter may be a type 74184, and the binary-to-BCD converter may be a type 74185. It will be appreciated that additional interface and power supply circuitry would be required in connection with the use of these components, and that this is well known to the art and therefore has been omitted for the sake of clarity.

Thus, a data transmission system has been shown which derives data from two different sources of different significance and accuracy, recognizes possible errors between the two sources, and automatically makes a correction to the output data. The system provides for carrying and borrowing if necessary to correctly scale the output. The circuitry of the system is reliable and economical, requiring a minimal number of components and being well suited for fabrication in microcircuit form. It will be appreciated that while the system has been shown in connection with a system for remotely displaying the level of liquids, it can be used to provide an input signal to a computer or other non-displaying utilization means, and can be used for other measurement purposes where the position of a movable element must be remotely read with reliability and precision.

It will be understood that modifications and variations may be effected without departing from the scope of the novel concepts of the present invention, but it is understood that this application is to be limited only by the scope of the appended claims.

I claim:

1. In combination, a data transmission system for providing a digital output signal indicative of the cumulative angular position of a rotatable shaft within a predetermined range of movement in terms of predetermined units of measurement, said digital output signal having a most significant portion indicating the cumulative angular position of said shaft in terms of an integral number of said units of measurement, and a least significant portion indicating only the non-cumulative angular position of said shaft in terms of a fractional portion of one of said units of measurement, said system comprising:

means comprising a first encoder responsive to the position of said shaft for providing a first analog data signal indicative of the cumulative position of said shaft within said range of movement;

first conversion means responsive to said first analog data signal for producing a first digital data signal indicative of the cumulative position of said shaft in terms of an integral number and a fractional part of said units of measurement, said indication being subject to an error of one of said units of measurement;

means comprising a second encoder responsive to the position of said shaft for providing a second analog data signal indicative of the non-cumulative position of said shaft;

second conversion means responsive to said second analog data signal for producing a second digital data signal indicative of the non-cumulative position of said shaft in terms of a fractional part of said units of measurement, said indication being subject to an error of less than one of said fractional parts;

utilization means responsive to said first digital data signal for providing said most significant portion of said digital output signal and responsive to said second digital data signal for providing said least significant portion of said digital output signal; and error correction means for modifying said first digital data signal according to the data signals from said first and second encoders to compensate for said one unit error, if present, in said first digital data signal, such that said digital output signal accurately reflects the cumulative position of said shaft.

2. A data transmission system as defined in claim 1 wherein said error correction means include means for comparing a least significant portion of said first digital data signal with a most significant portion of said second digital data signal.

3. A data transmission system as defined in claim 2 wherein said least significant portion of said first digital data signal and said most significant portion of said second digital data signal are like fractional parts of said units of measurement.

4. A data transmission system as defined in claim 3 wherein said first and second conversion means comprise analog-to-BCD converters.

5. A data transmission system defined in claim 1 wherein said first digital data signal is subject to an error not exceeding ±50 percent of said units of measurement, and said error correction means comprise means for adding or subtracting one unit of measurement from the least significant digit of said most significant portion of said digital output signal.

6. A data transmission system as defined in claim 1 wherein said utilization means include display means responsive to said digital output signal.

7. A data transmission system for providing a digital output signal indicative of the level of a liquid within a liquid storage tank in terms of predetermined units of measurement, said digital output signal having a most significant portion indicating said level in terms of an integral number of said units of measurement, and a least significant portion indicating said level in terms of a fractional portion of said units of measurement, said system comprising, in combination:

a direct type liquid float gauge for positioning an output shaft in accordance with the level of said liquid;

a first encoder coupled to said output shaft for generating a first analog data signal representative of the cumulative angular position of said shaft;

first conversion means for converting said first analog data signal to a first digital data signal indicative of the cumulative angular position of said shaft in terms of an integral number and a fractional part of said predetermined units of measurement;

a second encoder coupled to said output shaft for generating a second analog data signal representative only of the non-cumulative angular position of said shaft;

second conversion means for converting said second analog data signal to a second digital data signal indicative only of the non-cumulative angular position of said shaft in terms of a fractional part of said predetermined units of measurement;

display means responsive to said first and second digital data signals for providing a digital display indicative of the cumulative position of said shaft in terms of said predetermined units of measurement, said digital display having a most significant portion responsive to said first digital data signal and subject to an error of plus one or minus one of said units of measurement, and a least significant portion responsive to said second analog data signal; and error correction means for modifying said first digital data signal according to said first and second digital data signals to compensate for said one unit error, if present, in said most significant portion of said digital output display.

* * * * *